United States Patent [19]

Paap et al.

[11] 3,916,685
[45] Nov. 4, 1975

[54] WELL LOGGING SYSTEM AND METHOD USING AN ARMORED COAXIAL CABLE AND COMPENSATION CIRCUIT

[75] Inventors: Hans J. Paap; Robert W. Pitts, Jr., both of Houston, Tex.

[73] Assignee: Texaco Inc., New York, N.Y.

[22] Filed: Oct. 27, 1971

[21] Appl. No.: 192,883

Related U.S. Application Data

[63] Continuation-in-part of Ser. No. 82,028, Oct. 19, 1970, abandoned.

[52] U.S. Cl. .............................. 73/152; 250/83.6 W
[51] Int. Cl. ............................................ E21b 47/12
[58] Field of Search ................ 73/152; 250/83.6 W; 340/18 P, 18 R, 210

[56] References Cited
UNITED STATES PATENTS

| | | | |
|---|---|---|---|
| 2,350,371 | 6/1944 | Smith | 181/0.5 |
| 2,848,710 | 8/1958 | Owen | 340/210 |

*Primary Examiner*—Jerry W. Myracle
*Attorney, Agent, or Firm*—Thomas H. Whaley et al.

[57] ABSTRACT

A well logging system comprising a transmitter in a borehole having a sensor such as a radiation detector, a condition relating to the earth's formation traversed by the borehole and providing data pulses corresponding in number and peak amplitude to the sensed condition. The transmitter also includes a reference pulse source and means for combining the reference pulses and the data pulses. The combined pulses are conducted to a receiver at the surface by an inner conductor of an armored coaxial cable. The shield of the armored coaxial cable is insulated from the inner conductor and from an outer cable armor which surrounds it. The shield provides a return path for the combined pulses thereby reducing the skin effect encountered when using the outer armor as a return path. High voltage for energizing the sensor is also conducted to the sensor by the inner conductor of the armored coaxial cable from a direct current power supply on the surface. Low voltage is conducted by the shield of the armored coaxial cable from the power supply to the sensor, to the reference pulse source and to the combining means while the outer armor of the armored coaxial cable provides a common ground connection between the transmitter, the power supply and the receiver. The receiver includes a compensating circuit which monitors the reference pulses and adjusts the data pulses in accordance with the monitored reference pulses to compensate for deterioration of the data pulses during their transmission. The receiver also includes recording means which provides a record of the sensed nature of the earth formation in accordance with the compensated data pulses. The invention is of particular utility as embodied in a nuclear logging system.

11 Claims, 11 Drawing Figures

WELL LOGGING SYSTEM AND METHOD USING AN ARMORED COAXIAL CABLE AND COMPENSATION CIRCUIT

CROSS REFERENCE TO RELATED APPLICATIONS

This application is a continuation as to all subject matter common to U. S. application Ser. No. 82,028, filed Oct. 19, 1970 now abandoned by Hans J. Paap and Robert W. Pitts and assigned to Texaco Inc., assignee of the present invention, and a continuation-in-part for all additional subject matter.

BACKGROUND OF THE INVENTION

1. Field of the Invention

The present invention relates to well logging systems in general and, more particularly, to the transmission and processing of signals in a well logging system.

2. Description of the Prior Art

Heretofore, well logging systems used coaxial cables where the outer conductor is made with steel to protect the inner portions of the cables for connecting the surface electronics to a logging instrument. The steel conductor added to the distortion of the pulses being transmitted to the surface since the pulses have high frequency components. Since the peak pulse height and the number of pulses convey information, the distortion of the pulses affected the interpretation of the information by reducing the peak pulse height and lengthening out the pulse width. The distortion resulted from the skin effect, i.e., most of the high frequency current was near the surface of the steel conductor thereby reducing the cross sectional area of the conductive material causing an increase in resistance for the high frequency components of the pulses. The changing attenuation caused by temperature and wellbore pressure on the cable reduced the quality of the pulses thereby affecting a time variation in the amplitude of the pulses at the surface. The present invention uses an armored coaxial cable, to conduct pulses from the logging instrument to the surface electronics, and high and low direct current voltages from the surface electronics to the logging instrument. The return path for the pulses is a copper shield which considerably reduces the skin effect attenuation and hence the distortion of the pulses.

A compensating circuit adjusts the amplitude of the pulses from the logging instrument so as to overcome the effect of the borehole temperature and pressure on the capacitance and resistance of the armored coaxial cable and on the borehole transmitter and on that portion of the surface electronics and the signal path between the armored coaxial cable and the compensating circuit.

SUMMARY OF THE INVENTION

A well logging system comprising a downhole logging instrument, a transmission system and surface electronics, provides an output corresponding to a condition sensed in a borehole. The system comprises a logging instrument adapted to be passed through a borehole. The instrument includes a sensor and associated circuitry for providing a signal representative of the condition sensed in the borehole. A signal generator provides a reference signal. A transmission system comprises an armored coaxial cable which is connected between said logging instrument and surface electronics adjacent the borehole. The armored coaxial cable comprises an inner coaxial conductor, an outer coaxial conductor separated from the inner conductor by a coaxial first insulator, and an outer armor of conductive material separated from said outer conductor by a coaxial second insulator. The logging instrument further includes means for applying the condition and reference signals to one end of the transmission system. The surface electronics include a network coupled to the other end of the transmission system for receiving the signals over the armored coaxial cable from the signal applying means. A compensating circuit adjusts the signals from the network to compensate for the deterioration of the signals, in accordance with a change in the amplitude of the reference signal, to provide compensated signals. An output circuit provides the output corresponding to said sensed condition in accordance with the compensated signals from the compensating circuit. In an preferred embodiment the sensor is a radiation detector of a radiation logging system, providing pulses corresponding in number and peak amplitude to the detected radiation. The multitudes of the peak amplitudes form amplitude distributions, more commonly known as pulse height spectra, which can be analyzed by a multichannel pulse height analyser to aid in the determination of the composition and contents of the earth formation traversed by the borehole.

One object of the present invention is to provide an improved well logging system using an armored coaxial cable between a transmitter, a receiver and power supplies.

Another object of the present invention is to compensate signals conducted by an armored coaxial cable for the effect of temperature on the armored coaxial cable.

Another object of the present invention is to combine reference pulses with pulses corresponding to a sensed condition prior to conduction by an armored coaxial cable so that the condition pulses may be adjusted in accordance with any deterioration of the reference pulses resulting from the conduction by the armored coaxial cable.

Another object of the present invention is to use an armored coaxial cable having an inner conductor for conducting pulses from a transmitter to a receiver and a high voltage from a power supply to a sensor in the transmitter, having a shield for providing a return path for the pulses and carrying low voltage from a power supply to the sensor and other circuits in the transmitter, and having an outer armor for providing a common ground connection for the power supply, the receiver and the transmitter.

Another object of the invention is to improve the quality of transmitted pulses from a well logging sonde in a borehole by using a shield of an armored coaxial cable as the return path for the pulses instead of the outer armor of the armored coaxial cable.

The foregoing and other objects and advantages of the invention will appear more fully hereinafter in consideration of the detailed description which follows and together with the accompanying drawings wherein several embodiments of the invention are illustrated. It is to be especially understood, however, that the drawings are for illustration purposes only and are not to be construed as defining the limits of the invention.

DESCRIPTION OF THE INVENTION

Figure 1:
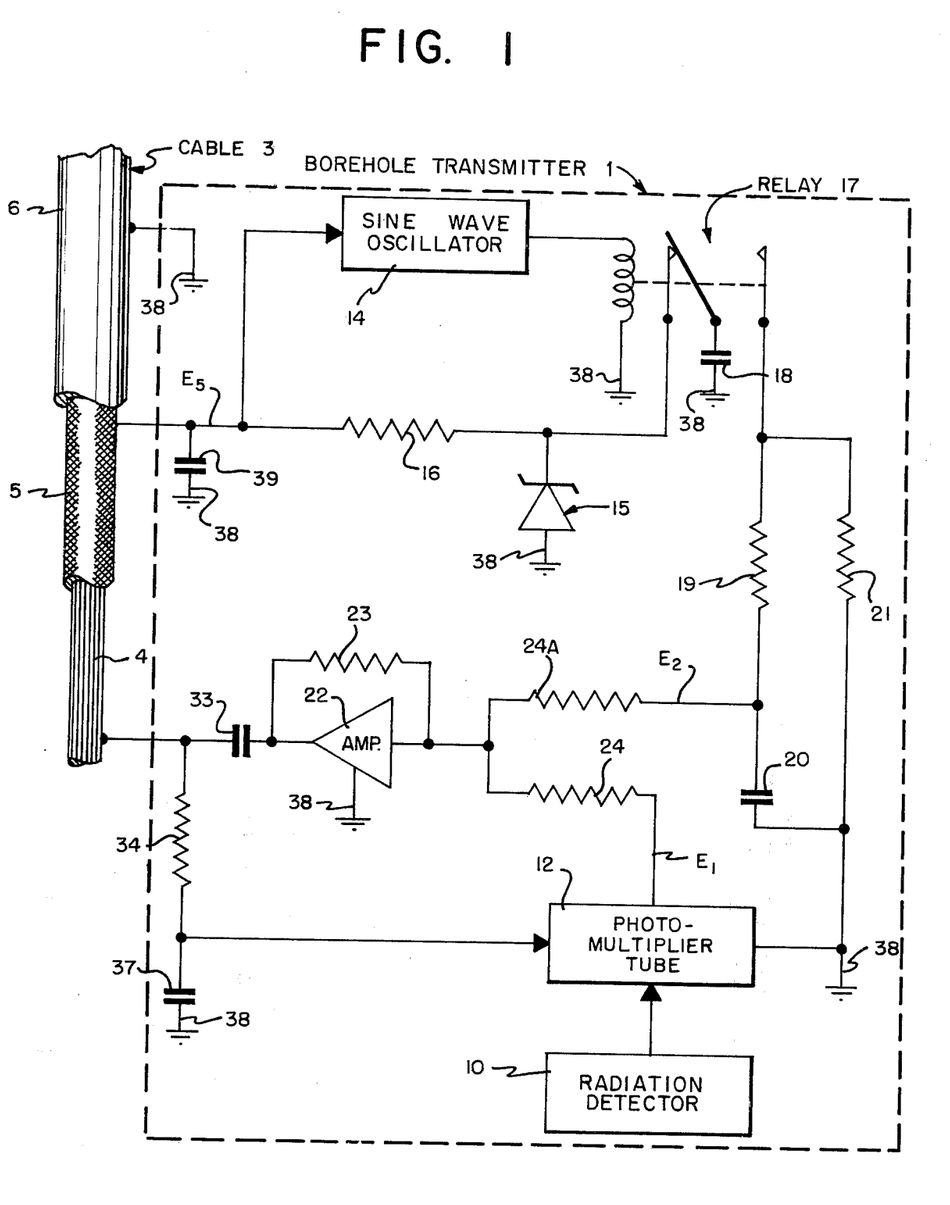
FIGS. 1 and 2 are simplified block diagrams of a well logging system, constructed in accordance with the present invention, for providing a record of a condition relative to the earth formation traversed by a borehole.
Figure 2:
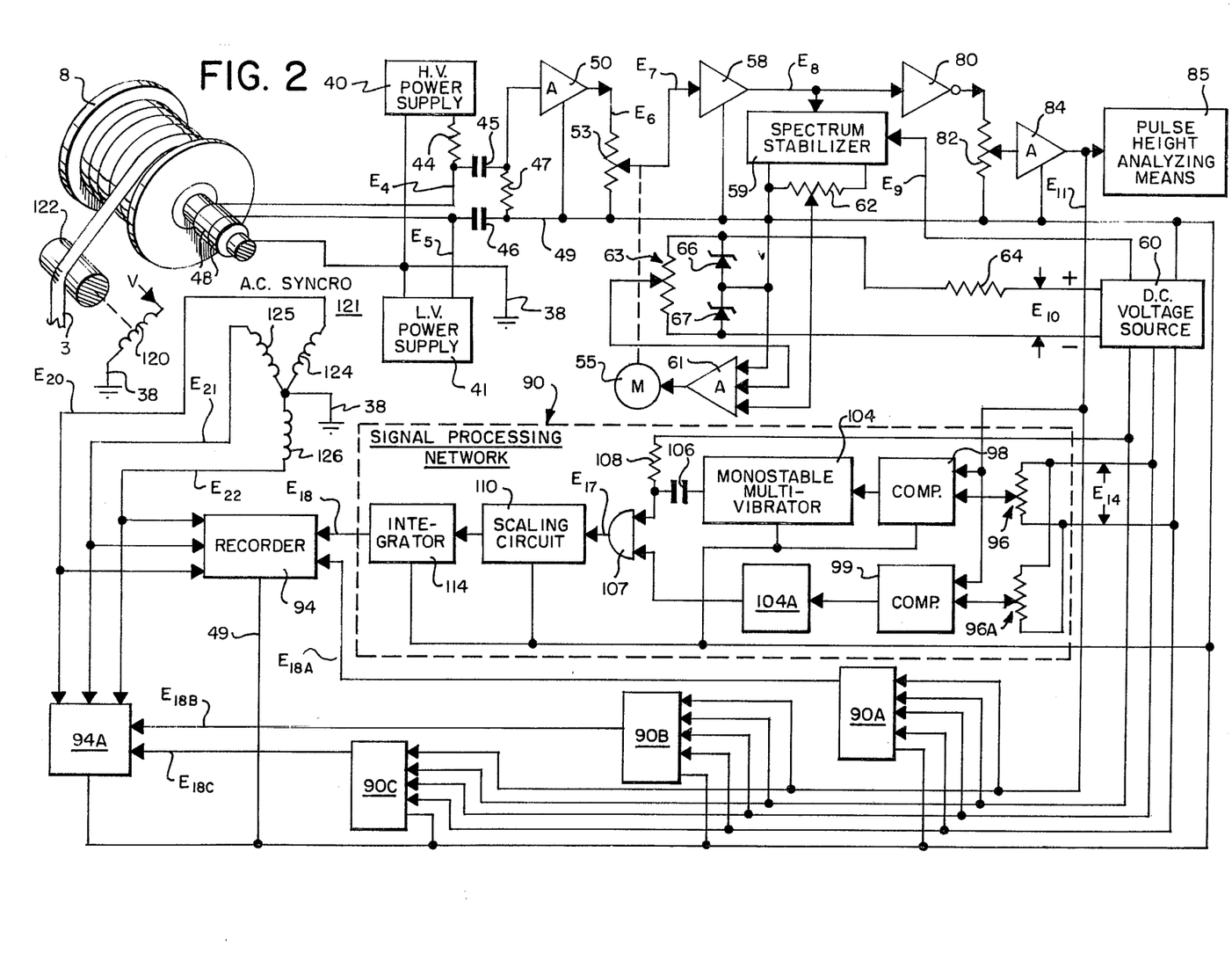
Figure 4:
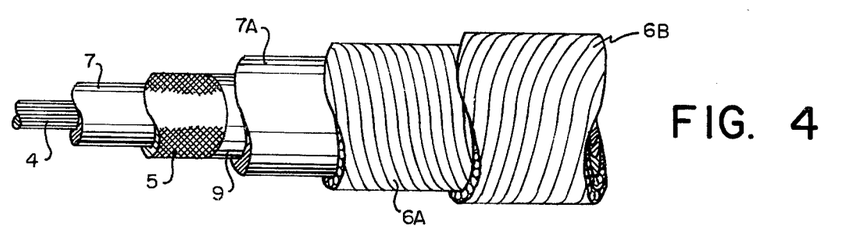
FIG. 4 is a detailed drawing of the cable shown in FIG. 1.

Referring to FIGS. 1 and 2, there is shown a preferred embodiment of the invention in which a logging transmitter 1, shown in detail in FIG. 1, while passing through a borehole transmits pulses corresponding to the nature of the earth formation traversed by the borehole. The pulses from transmitter 1 are conducted to a receiver 2 by an armored coaxial cable 3 where the pulses are amplitude adjusted to compensate for the effect of borehole temperature as hereinafter explained. Cable 3 may be of the type manufactured by the Vector Cable Company under their part number A-4029 and has an inner conductor 4, a shield 5 and an outer armor 6. Armored coaxial cable 3 is shown in greater detail in FIG. 4. Conductor 4 is No. 16 AWG, 19 strands of 0.0117 inch tinned copper wires. Conductor 4 is separated from shield 5 by a propylene copolymer dielectric 7 having a wall thickness of 0.062 inch. Shield 5 is No. 36 AWG tinned copper wire, nine ends, 16 carriers, 10 ppi with 90 percent coverage. A Mylar tape 9 is wrapped around the outer side of the shield 5 with a 45 percent overlap. Another propylene copolymer dielectric 7A has a wall thickness of 0.015 inch and separates tape 9 from armor 6. Armor 6 is divided into two sections 6A and 6B. Armor 6A is composed of 18 strands of 0.042 inch galvanized steel wires preformed right lay and has a coating of anti-corrosion compound. Armor 6B is composed of 18 strands of 0.059 inch galvanized steel wires, preformed left lay, and has a coating of an anti-corrosion compound. The opposite lays of the inner and outer armor is to prevent unravelling while in use. Cable 3 is stored on a reel 8 and may be unwound from reel 8 to lower transmitter 1 into the borehole or wound on reel 8 to raise transmitter 1.

Receiver 2, shown in detail in FIG. 2, provides graphic recordings of the nature of the earth formation traversed by the borehole in accordance with the compensated signals, as hereafter explained.

Figure 3A:
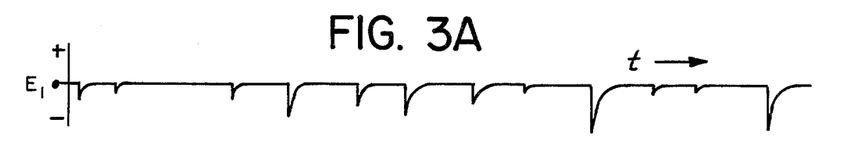
FIGS. 3A through 3E are diagrammatic representations showing waveforms occurring during operation of the well logging system shown in FIGS. 1 and 2.
Figure 3B:
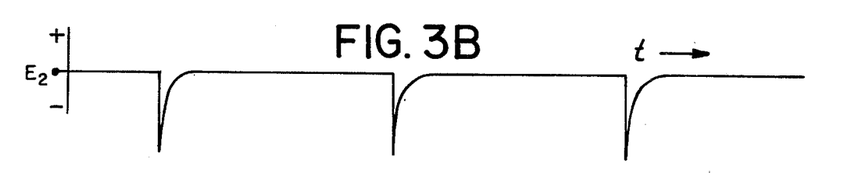
Figure 3C:
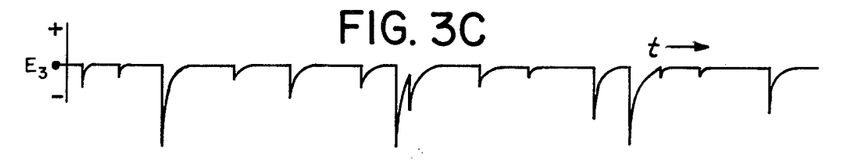

Referring to FIG. 1, there is shown a borehole transmitter 1, of a nuclear logging system, which includes a circuit for sensing a condition relative to the earth formation and provides corresponding negative going data pulses $E_1$, as shown in FIG. 3A, corresponding in number and peak amplitude to the gamma radiation; a circuit for providing negative going references pulses $E_2$, as shown in FIG. 3B; and a circuit for combining pulses $E_1$, $E_2$, to provide a pulse train $E_3$, as shown in FIG. 3C. The condition, by way of example, may be the chlorine content of the earth formation. The sensing circuit includes a conventional type sodium iodide (thallium activated) crystal detector 10 detecting gamma radiation emitted by the earth formation resulting from the natural isotopes of the earth formation or from neutron bombardment of the earth formation. Neutron bombardment is well known in the art and it is not necessary for one skilled in the art to know the details of neutron bombardment in order to understand the present invention. Radiation detector 10 provides light pulses, corresponding in number and amplitude to the gamma radiation to a photo-multiplier tube 12 which converts the light pulses to electrical pulses to provide negative going data pulses $E_1$ corresponding in number and peak amplitude to the gamma radiation.

The reference signal circuit includes a sine wave oscillator 14 which is energized by a low amplitude direct current voltage $E_5$ present on shield 5 of cable 3. Direct current voltage $E_5$ is applied through a voltage dropping resistor 16 to a zener diode 15 connected to ground 38. Oscillator 14 periodically energizes the coil of a single pole, double throw mercury relay 17. When relay 17 coil is energized, the direct current voltage being held by capacitor 18 is transferred to a pulse shaping network which provides reference pulse $E_2$ which is substantially larger in amplitude than a data pulse $E_1$, as shown in FIGS. 3A, 3B.

The pulse shaping network includes a resistor 19 and a capacitor 20 connected in series between relay 17 and ground and shunted by another resistor 21. Resistors 19 and 21 control the charging and discharging rate of capacitor 20 so that the reference $E_2$ pulse developed across capacitor 20 resembled data pulses $E_1$.

Pulses $E_1$, $E_2$ are summed by a summing network to provide a pulse train $E_3$. The summing network includes an amplifier 22 having a common input-output terminal connected to ground 38 and a feedback resistor 23 connecting its output to its input, and summing resistors 24, 24A receiving pulses $E_1$ and $E_2$, respectively, from photomultiplier tube 12 and capacitor 20, respectively. The repetition rate of pulses $E_2$ should be such so as to reduce the probability of a simultaneous occurance of a data pulse $E_1$, and reference pulse $E_2$ thereby minimizing any resulting error.

A blocking capacitor 33 connecting amplifier 22 to conductor 4 prevents a large amplitude direct current voltage $E_4$, present on conductor 4, as hereinafter explained, from affecting amplifier 22. Voltage $E_4$ is applied through a resistor 34 to energize photo-multiplier tube 12. A capacitor 37 connecting resistor 34 to ground 38 filters out unwanted alternating current voltages that may be present with voltage $E_4$. Resistor 34 is used to provide a voltage difference between conductor 4 of cable 3 and ground 38 so that pulse train $E_3$ is not shunted to ground 38 by capacitor 37. The outer armor 6 of cable 3 is connected to ground 38 in transmitter 1 and at the surface of the borehole so that a common ground is provided. Photo-multiplier tube 12, oscillator 14, and the coil of relay 17 are connected to ground 38.

A capacitor 39 couples shield 5 to outer armor 6 of cable 3 so that shield 5 is at alternating current ground and provides a low resistance return path for pulse train $E_3$.

Referring to FIG. 2, there is shown sources 40, 41 of direct current voltages $E_4$ and $E_5$, respectively, a circuit for passing pulse train $E_3$ while blocking direct current voltages $E_4$ and $E_5$, a circuit for restoring the quality of the pulses in pulse train $E_3$, and a recording system.

Source 40 is connected to ground 38 and provides voltage $E_4$ to conductor 4 of cable 3 through a current limiting resistor 44 and slip rings 48. Source 41 is connected to ground 38 and provides voltage $E_5$ to shield 5 of cable 3 through slip rings 48.

The passing circuit includes capacitors 45, 46 which pass pulse train $E_3$ to a conventional type linear amplifier 50 and blocks voltages $E_4$ and $E_5$ also present on conductor 4 and shield 5, respectively, of cable 3.

A resistor 47 connects capacitor 45 to capacitor 46 and pulse train $E_3$ is developed across resistor 47. A conductor 49, connected to the connection between capacitor 46 and resistor 47, is used as return path for pulse train $E_3$ in receiver 2.

Figure 3D:
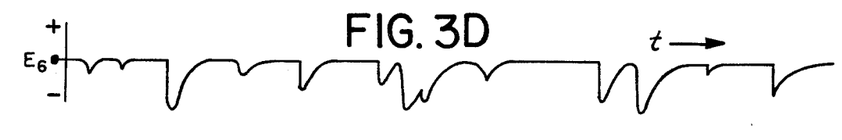

Amplifier 50 amplifies pulse train $E_3$ to provide a pulse train $E_6$, shown in FIG. 3D, to a restoring circuit. As pulse train $E_3$ is conducted by cable 3, the resistance and the capacitance of cable 3 affects pulse train $E_3$.

Figure 5:
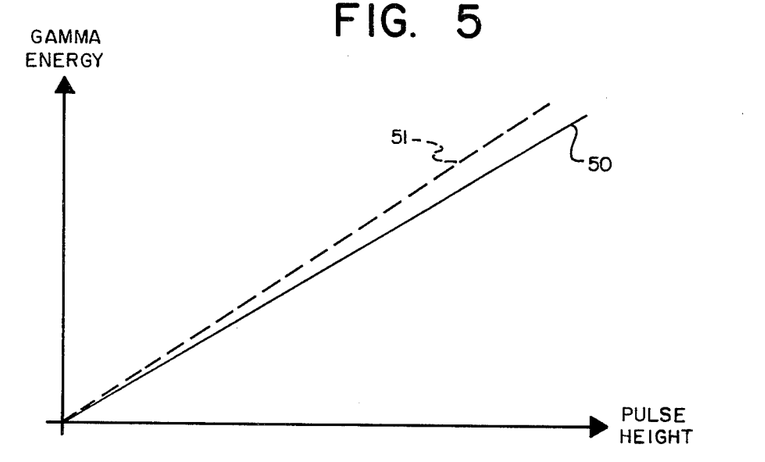
FIG. 5 is a diagrammatic representation of a typical energy versus pulse height curve along with an error curve.

The resistance and capacitance of cable 3 varies due to the non-uniform temperature of the borehole which also affects amplifier 22. Referring to FIG. 5, the gamma energy versus pulse height curve 50 is linear. Temperature variation on cable 3 causes curve 50 to change to a new gamma energy versus pulse height curve which is also linear and passes through zero as indicated by the dash line 51. Since the temperature is not uniform throughout the borehole a direct temperature compensating circuit cannot be improvised readily. Furthermore temperature also affects that portion of the surface electronics in the signal path between cable 3 and the restoring circuit. The restoring circuit increases or decreases the amplitudes of all the pulses in pulse train $E_6$ as the amplified reference pulses require an increase or decrease in their amplitudes to compensate for the effect of cable 3.

Referring to FIG. 2, the restoring circuit includes a potentiometer 53 receiving amplified pulse train $E_6$ from amplifier 50 and having a wiper arm that is positioned by a motor 55, as hereinafter explained, to provide a compensated pulse train $E_7$ to a follower amplifier 58. Follower amplifier 58 prevents loading of potentiometer 53 while providing a pulse train $E_8$ corresponding to pulse train $E_7$. A spectrum stabilizer 59, which may be of a type NC20 manufactured by Hamner Inc., compares the amplitude of the reference voltage $E_9$ from a source 60 of direct current voltages. Reference voltage $E_9$ corresponds to a predetermined amplitude for the reference pulses in pulse train $E_8$. Spectrum stabilizer 59 provides a direct current voltage, whose polarity corresponds to whether the amplitude of a reference pulse is greater or less than the reference voltage and whose amplitude corresponds to the difference in amplitudes between the reference pulse and the reference voltage.

The direct current voltage from spectrum stabilizer 59 is dropped across a potentiometer 62 so that only a portion of the direct voltage is applied to a servo amplifier 61. Servo amplifier 61 provides an error signal, which controls motor 55 to position the wiper arm of potentiometer 53, in accordance with the direct current voltage from spectrum stabilizer 59 and a direct current signal corresponding to the position of the wiper arm of potentiometer 53. Motor 55 simultaneously positions the wiper arm of a potentiometer 63 which provides the direct current signal to servo amplifier 61 that corresponds to the position of the wiper arm of potentiometer 53.

The reference signal from potentiometer 63 results from a direct current voltage $E_{10}$ from voltage source 60 being applied across a current limiting resistor 64 and potentiometer 63. Potentiometer 63 is shunted by series connected zener diodes 66, 67 having a common connection to conductor 49 and servo amplifier 61. Diodes 66, 67 maintain the voltage across potentiometer 63 at a constant level. The signal corresponding to position of the wiper arm of potentiometer 53 is obtained from the wiper arm of potentiometer 63.

Referring back to FIG. 2, the recording system includes an inverter 80, a potentiometer 82, an amplifier 84, data processing networks 90, 90A, 90B and 90C, and recorders 94, 94A. Inverter 80 inverts pulse train $E_8$ from follower amplifier 58 in amplifying pulse train $E_7$. Inverter 80 applies the inverted pulse train $E_8$ to a gain control potentiometer 82 whose wiper arm passes a reduced pulse train to amplifier 84.

Figure 3E:
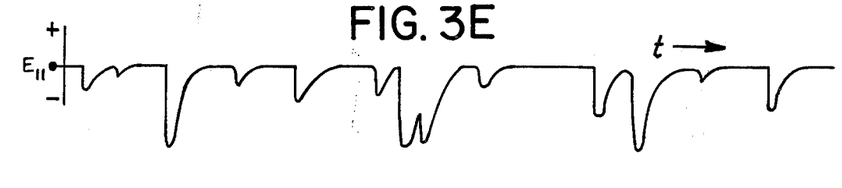

Amplifier 84 provides a pulse train $E_{11}$, as shown in FIG. 3E, having data and reference pulses conventional pulse height analyzing means 85 and to signal processing networks 90 through 90C. Pulse height analyzing means provides a special analysis of the data pulses in pulse train $E_{11}$. Direct current voltage source 60 provides a direct current reference voltage $E_{14}$ to signal processing networks 90, 90A, 90B and 90C. All elements having a numerical designation with a suffix are connected and operate in the same manner as elements having the same numerical designation without a suffix.

Signal processing network 90 provides an integrated output $E_{18}$ to a recorder 94 which may be of a type manufactured by the Leeds and Northup Company as their Speedomax G recorder. Integrated output $E_{18}$ corresponds to the number of data pulses $E_{11}$ whose amplitudes are within a predetermined range corresponding to a condition of the earth's formation. Network 90 includes reference level potentiometer 96, 96A having direct current voltage $E_{14}$ applied across them, coventional comparators 98, 99 receiving data pulses $E_{11}$, monostable multivibrators 104 and 104A, a capacitor 106, a resistor 108 receiving a negative direct current voltage $E_{15}$, an AND gate 107, a scaling circuit 110, and an integrator 114.

Adjustment of the wiper arms of potentiometers 96, 96A sets the amplitudes of the reference voltages for the range of amplitudes of data pulses $E_{11}$ that will be recorded by recorder 94. Comparator 98 compares data pulses $E_{11}$ with the reference voltage from potentiometer 96 and provides an output when the amplitude of a data pulse $E_{11}$ is greater than the amplitude of the reference voltage and no output when the amplitude is less than the reference voltage. Multivibrator 104 provides a pulse to a differentiating circuit consisting of capacitor 106 and resistor 108, receiving a direct current voltage from source 60, in response to an output from comparator 98. Capacitor 106 and resistor 108 differentiates the pulse from multivibrator 104 to provide a spike pulse on the trailing edge to AND gate 107. Potentiometer 96A, comparator 99 and multivibrator 104A operate to provide a pulse to AND gate 107 when a data pulse $E_{11}$ has an amplitude greater than the amplitude of reference voltage from potentiometer 96A and no pulse when the amplitude of a data pulse $E_{11}$ is less than the reference voltage.

AND gate 107 passes a negative spike pulse from multivibrator 104 as a pulse $E_{17}$. When a pulse from multivibrator 104A occurs simultaneously with the negative spike pulse the negative spike pulse is blocked. Thus pulse $E_{17}$ from AND gate 107 only occurs when the amplitude of a data pulse $E_{11}$ is within the range of amplitudes defined by the reference voltages from potentiometers 96, 96A.

Scaling circuit 110, connected to AND gate 107, consists of flip-flops connected in a conventional manner so as to provide an output of one pulse for a predetermined number of pulses $E_{17}$. By way of example, scaling circuit 110 may provide one pulse for every eight data pulses $E_{11}$ whose amplitudes fall within the range defined by the reference voltages from potentiometers 96, 96A.

Integrator 114 integrates the pulses from scaling circuit 110 to provide output $E_{18}$ to recorder 94. Recorder 94 provides a graphic record of a condition of the earth's formation traversed by the borehole in accordance with output $E_{18}$. Recorder 94 also provides a record in accordance with output 18A from signal processing network 90A, while recorder 94A provides records in accordance with outputs $E_{18B}$, $E_{18C}$ from signal processing networks 90B and 90C, respectively.

Recorders 94, 94A recording speeds are controlled so that there exists a predetermined relationship between distance in the borehole and distance on the records provided by the recorders 94, 94A. A rotor winding 120 of an alternating current synchro transmitter 121 receiving an alternating voltage V and connected to ground 38 is mechanically linked to a roller 122. As cable 3 moves roller 122, rotor winding 120 rotates accordingly causing stator windings 124, 125 and 126, having a common connection to ground 38, to provide signals $E_{20}$, $E_{21}$ and $E_{22}$ corresponding to the descent or ascent rate of transmitter 1 in the borehole. Signals $E_{20}$, $E_{21}$ and $E_{22}$ are applied to alternating current synchro receivers (not shown) in recorders 94, 94A which control the recording speed of recorders 94, 94A.

The potentiometers in signal processing networks 90, 90A, 90B, and 90C are adjusted so that networks 90, 90A, 90B and 90C are not affected by the reference pulses appearing in signal $E_{11}$.

The following elements are connected to conductor 49: amplifiers 50, 58, 61 and 84, spectrum stabilizer 59, potentiometers 53 and 82, direct current voltage source 60, comparators 98 and 99, monstable multivibrators 104 and 104A, scaling circuit 110, integrator 114 and recorders 94 and 94A. Although not shown for ease of explanation, the following elements receive voltage 5 from power supply 41 for biasing or energization as needed: amplifiers 50, 58, 61 and 84, spectrum stabilizer 59, comparators 98 and 99, monostable multivibrators 104 and 104A, AND gate 107, scaling circuit 110, integrator 114, and recorders 94 and 94A.

In another embodiment, the sodium iodide crystal may be doped with an alpha emitting isotope such as Americium 241 or other transuranic isotopes having high energy alpha emission, low intensity and low energy gamma emission. When so doped, detector 10 periodically provides a pulse which causes photomultiplier tube 22 to provide a corresponding reference pulse of sufficient amplitude. Oscillator 14, resistors 16, 19, 21, 23, 24 and 24A, relay 17, capacitor 20 and zener diode 15 may be eliminated. Amplifier 22 would be retained, but it is used for amplification of the pulses from photomultiplier tube 12 and not for combining signals.

Figure 6:
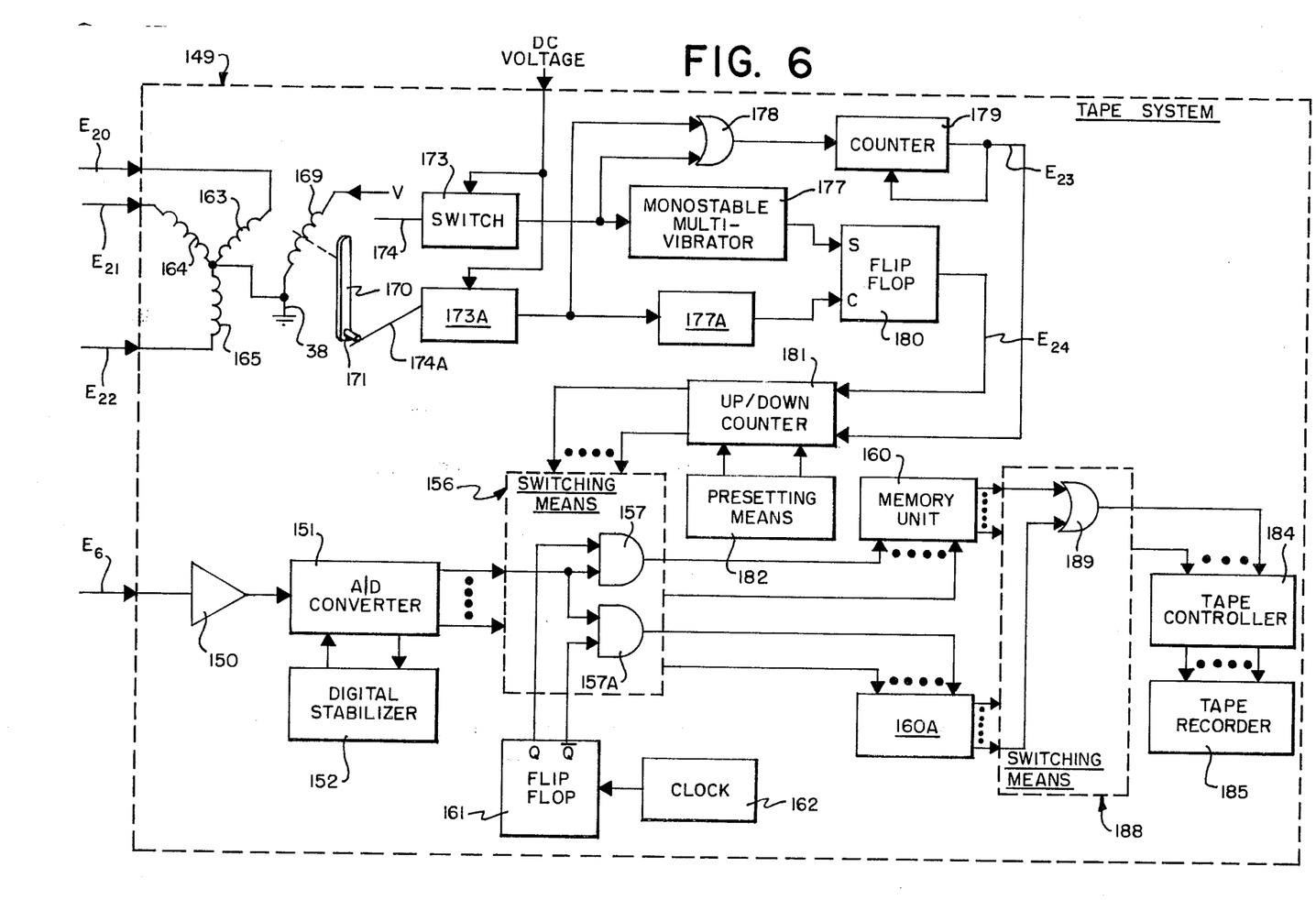
FIGS. 6 and 7 are block diagrams of a tape logging system and a noise discriminator, respectively, which may be used with the system shown in FIGS. 1 and 2.

In another embodiment pulses $E_6$ from amplifier 50 are converted to signals which are stored on magnetic tape by a tape system 149 for use with a computer. Referring to FIG. 6 pulses $E_6$ are amplified by an amplifier 150 in system 149 which may be of the type manufactured by Hamner Inc. as part No. NA11. The amplified pulses are applied to an analog-to-digital converter 151. Converter 151 may be of the type manufactured by Northern Scientific Inc. as their part No. NS 629 and provides digital signals corresponding to the height of pulse $E_6$.

Converter 151 is controlled by a digital stabilizer 152 such as that sold by Northern Scientific Inc. as their part No. NS404N. Stabilizer 152 stabilizes both the conversion gain and zero level of converter 151. For gain stabilization, the reference pulses in pulses $E_6$ are used as a reference. The reference is centered in a digital window in stabilizer 152 and the conversion gain of converter 151 is adjusted to maintain statistically equal counts in the upper and lower window halves. Any drift in gain anywhere within the system will upset the statistical quality in the window halves and converter 151 gain will be adjusted by stabilizer 152 to correct for the drift. The digital signals provided by converter 151 are applied to switching means 156.

Switching means 156 includes pairs of AND gates. By way of example one digital signal from converter 151 is shown as being applied to a pair of AND gates 157, 157A, controlled by a flip-flop 161 being triggered periodically by pulses from a clock 162, which alternately pass the digital signal to memory units 160 and 160A, respectively. Similarly, each of the remaining digital signals are alternately passed by pairs of AND gates controlled by flip-flop 161 in switching means 156. The frequency of the changing of state flip-flop 161 is selected so that the recording time on the magnetic tape is less than the accumulation time by converter 151.

Pairs of AND gates in switching means 156 are also controlled by flip-flop 161 to alternately provide signals corresponding to the depth of transmitter 1 in the borehole to memory units 160, 160A.

Signals $E_{20}$, $E_{21}$ and $E_{22}$ from synchro transmitter 95 are applied to stator windings 163, 164 and 165 of a synchro receiver 167 having a common connection to ground 38. A rotor winding 169 of synchro receiver 167 receives alternating current voltage V and is connected to ground 38. Rotor winding 169 rotates and follows the rotation of rotor winding 120 of synchro transmitter 95 so that the rotation of rotor winding 169 corresponds to the descent rate or ascent rate of transmitter 1. Rotor winding 169 is connected to a rigid member 170 having a corresponding member 171. A pair of switches 173 and 173A, having levers 174 and 174A, respectively, are positioned in a manner such that during the rotation, member 171 will displace a lever 174 or 174A. A direct current voltage is applied to switches 173 and 173A. When a lever 174 or 174A of a switch 173 or 173A is momentarily displaced by member 171, switch 173 or 173A passes a direct current voltage so as to effectively provide a pulse for each rotation of 170. The pulses from switches 173, 173A are applied to monostable multivibrators 177 and 177A, respectively, and through an OR gate 178 to a counter 179. Counter 179 is connected so that on reaching a count of two, it resets itself. Counter 179 effectively provides one counting pulse $E_{23}$ for every two pulses from switches 173, 173A. Multivibrators 177, 177A control a flip-flop 180 which in turn provides a directional signal $E_{24}$. Flip-flop 180 while in the clear state provides a low level direct current voltage as the directional signal $E_{24}$. While in the set state, flip-flop 180 provides a high level direct current voltage as the directional signal $E_{24}$. When member 170 is being rotated in one direction, it will strike lever 174 prior to displacing lever 174A. The pulse from switch 173 is counted by counter 179 while multivibrator 177 is triggered by the pulse from switch 173 and in time triggers flip-flop 180. The time delay is unimportant on the first pulse.

Members 170 and 171 continue to rotate, displacing lever 174. The resulting pulse provided by switch 173A causes counter 179 to provide a counting pulse $E_{24}$. Due to the time delay of multivibrator 177A, flip-flop 180 is still in a set state and signal $E_{24}$ is at a high level. Up-down binary-coded-decimal counter 181 may be of the type manufactured by Fairchild Semiconductor as part No. 9306.

When the rotation of member 170, 171 are in an opposite direction, member 171 will displace lever 174A prior to displacing lever 174. Flip-flop 180 is in a clear state when counter 179 provides a counting pulse $E_{23}$ in response to the lever 174 being displaced by member 171. Counter 181 then counts pulse $E_{23}$ in a down direction in accordance with the low level directional signal $E_{24}$ from flip-flop 180.

When the logging operation is to start at a predetermined depth in the borehole, counter 181 is preset to a count corresponding to the predetermined depth by presetting means 182. Presetting means 182 includes conventional thumbwheel switches, which binary coded decimal signals are manually set to a decimal figure corresponding to the predetermined depth. Presetting means 182 also includes a plurality of AND gates which will enable transfer of the binary coded decimal signals from the thumbwheel switches to counter 181 so as to preset counter 181. Counter 181 counts pulses $E_{23}$ in a direction in accordance with signal $E_{24}$ so that the count in counter 181 corresponds to the depth in the borehole of transmitter 1.

Outputs from counter 181 are applied to memory units 160, 160A so that the data stored in memory units 160, 160A is associated with the depth from which the data was obtained. The outputs from memory units 160, 160A are applied to switching means 188 which includes a plurality of OR gates.

By way of example, one OR gate 189 of switching means 188 is shown receiving corresponding outputs from memory units 160, 160A and passing them to a tape controller 184, which may be of the type manufactured by Northern Scientific Inc. as their part No. NS406M. Tape controller 184 is basically a serializing device which accepts the passed digital signals from switchingg means 188 in a parallel format and serializes the parallel digital signals so that they may be recorded on tape. By way of example, when memory unit 160 or 160A provides a 12 bit digital word in parallel format, controller 184 serializes this in a form of a six bit word and applies the six bit words to a tape recorder 185 such as Kennedy Model 1400R which records the words on a tape.

Figure 7:
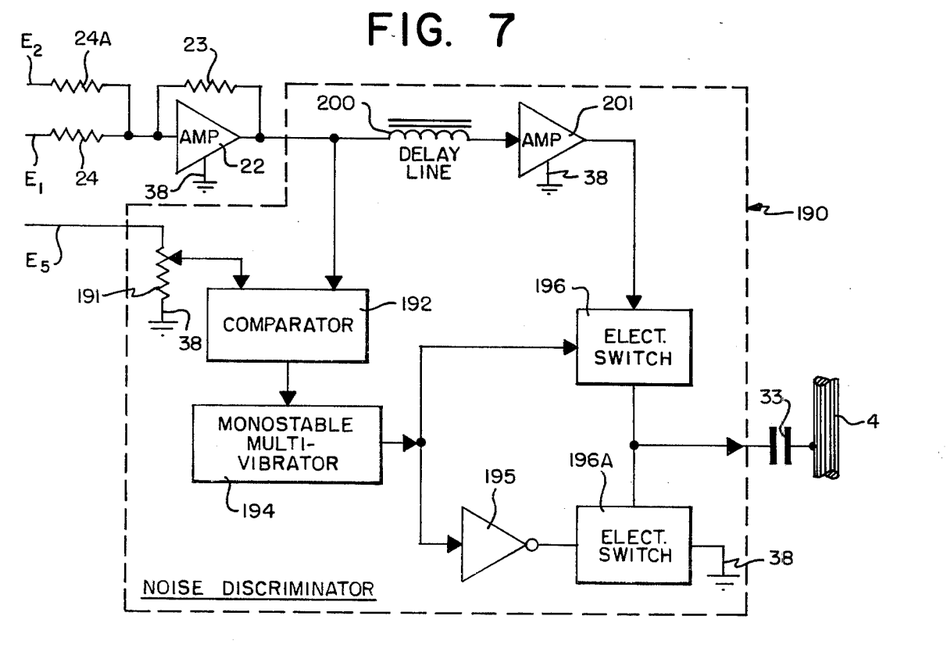

Referring now to FIG. 7, there is shown a noise discriminator 190 connected between amplifier 22 and capacitor 33 in downhole transmitter 1. Noise discriminator 190 prevents noise from being transmitted by cable 3 to the surface electronics by delaying the output from amplifier 22 and comparing the output during the time delay to a reference. Pulses exceeding the reference are applied to cable 3 while the noise which does not exceed the reference is not applied to cable 3.

Direct current voltage $V_5$ is applied to a potentiometer 191 connected to ground 38 whose wiper arm may be set to pick off a reference direct current voltage having an amplitude less than the expected data pulse amplitude but greater than the expected noise level. A comparator 192, comparing the output from amplifier 22 with the reference voltage from potentiometer 191, provides a high level direct current output when the amplifier 22 output is greater than the reference voltage from potentiometer 191. Comparator 192 provides a low level output when the amplifier 22 output is equal to or less than the reference voltage. During normal operation of discriminator 190 when noise is present and there is an absence of a data or a reference pulse from amplifier 22, comparator 192 output is at a high level. The high level output results in a monostable multivibrator 194 providing a low level output to an inverter 195 and to an electronic switch 196.

The low level output from multivibrator 194 renders switch 196 non-conductive. Inverter 195 inverts the low level output to a high level to render an electronic switch 196A conductive. When electronic switches 196, 196A are non-conductive and conductive, respectively, capacitor 33 receives no signal and is effectively connected to ground 38.

Upon the occurrence of a data pulse or a reference pulse output from amplifier 22, the pulse output is delayed by a conventional type delay line 200 for a predetermined time period and then amplified by an amplifier 201 having a connection to ground 38 to compensate for the attenuation of delay line 200. The output from amplifier 201 is applied to electronic switch 196. During the delay time period, comparator 192 output goes to a low level since the pulse output is greater than the reference voltage from potentiometer 191. The change in the comparator 192 output triggers multivibrator 194 to provide a pulse having a width of sufficient duration that the pulse from multivibrator 194 is still in existence when the delay time period ends. The pulse from multivibrator 194 is inverted by inverter 195 to render switch 196A non-conductive to remove capacitor 33 from ground. The pulse from multivibrator 194 renders switch 196 conductive to pass the amplified pulse from amplifier 201 to capacitor 33 and hence to cable 3.

The device of the present invention as heretofore described uses an armored coaxial cable between a transmitter, a receiver and power supplies and compensates a signal conducted by the armored coaxial cable for the effect of temperature on the signal. The device of the present invention combines reference pulses with pulses corresponding to a sensed condition prior to conduction by an armored coaxial cable so that the condition pulses may be adjusted in accordance with any deterioration of the reference pulses resulting from the conduction by the armored coaxial cable. The device of the present invention as heretofore described uses a cable having an inner conductor for conducting a signal from a transmitter to a receiver and a high amplitude direct current voltage from a power supply to a sensor in the transmitter, having a shield carrying a low amplitude direct current voltage from a power supply to the sensor and other circuits in the transmitter and providing a return path for the signal transmitted on the inner conductor, and having an outer armor for providing a common ground connection for the power supply, the receiver and the transmitter.

What is claimed is:

1. A well logging system for providing an output corresponding to a condition sensed in a borehole, comprising a logging instrument including means for providing a signal representative of said condition sensed in the borehole and means for providing a reference signal; a transmission system comprising an armored coaxial cable connected between said logging instrument and surface electronics adjacent the borehole, said cable comprising an inner coaxial conductor, an outer coaxial conductor separated from said inner conductor by a coaxial first insulator, and an outer armor of conductive material separated from said outer conductor by a coaxial second insulator, said logging instrument further includes means for applying said condition signal and said reference signal to one end of said transmission system; said surface electronics comprising receiving means coupled to the other end of said transmission system for receiving said signals over armored coaxial cable from the signal applying means, compensating means connected to the receiving means for adjusting said signals from the receiving means to compensate for deterioration of said signals to provide compensated signals and means connected to the compensating means for providing the output corresponding to said sensed condition in accordance with the compensated signals from the compensating means.

2. A system as described in claim 1 in which the applying means applies the condition signal and the reference signal across the inner coaxial conductor, the outer coaxial conductor, and the coaxial first insulator.

3. A system as described in claim 2 in which the logging instrument requires direct current operating voltages, and the surface electronics further comprises a direct current voltage source connected to the armored coaxial cable, and providing a direct current voltage of one amplitude, with respect to ground, to the inner coaxial conductor of the armored coaxial cable, and a direct current voltage of another amplitude, with respect to ground, to the outer coaxial conductor of the armored coaxial cable.

4. A system as described in claim 1 in which the applying means includes a low noise discriminator to prevent noise from being transmitted by the transmission system.

5. A system as described in claim 4 in which the condition signal has pulses corresponding in number and peak amplitude to the sensed condition and the reference signal has reference pulses of a predetermined amplitude; and the low noise discriminator includes amplifying means connected to the condition signal means and to the reference signal means for providing an output comprising amplified condition and reference pulses, means connected to the amplifying means for delaying the output from the amplifying means, means connected to the amplifying means and receiving a reference voltage corresponding to a predetermined noise level for comparing the output from the amplifying means with the reference voltage and providing a control pulse when the output from the amplifying means is greater than reference voltage and no control pulse when the output from the amplifying means is not greater than the reference voltage, and switching means connected to the delay means, to the comparing means and to the transmission system for passing the delayed output from the delay means to the transmission system in response to a control pulse from the comparing means and for blocking the delayed output from the delay means during the absence of a control pulse so as to effectively pass the amplified condition and reference pulses to the transmission system.

6. A system as described in claim 1 further comprising a tape recording system which includes means connected to the output means for converting the output corresponding to said condition to digital signals, at least two memory sections, means for recording digital signals on a magnetic tape, switching means connecting the converting means to the memory sections for alternately storing the digital signals from the converting means in one memory section and then the other memory section, and control means connected to the memory sections and to the tape recording means for controlling each memory section to transfer its digital signal content to the tape recording means while the other memory section is storing the digital signals from the converting means.

7. A system for providing an output corresponding to a condition sensed in a borehole, comprising a logging instrument adapted to be passed in a borehole, said instrument including means for providing pulses representative of said condition sensed in the borehole, means for providing reference pulses of a predetermined amplitude; a transmission system comprising an armored coaxial cable connected between said logging instrument and surface electronics adjacent to the borehole, said cable comprising an inner coaxial conductor, an outer coaxial conductor separated from said inner conductor by a coaxial first insulator and an outer armor of conductive material separated from said outer conductor by a coaxial second insulator, said logging instrument further includes means for applying said condition pulses and said reference pulses to one end of said transmission system, said surface electronics comprising receiving means coupled to the other end of said transmission system for receiving said pulses over said armored coaxial cable from the pulse applying means, compensating means connected to the receiving means for adjusting said pulses from the receiving means to compensate for deterioration of said pulses in accordance with the change in the amplitudes of said reference pulses to provide compensated pulses, and means connected to the compensating means for roviding the output corresponding to said sensed condition in accordance with the compensated pulses from the compensating means.

8. A system as described in claim 7 in which the compensating means includes adjusting means connected to the receiving means and to the output means for changing the amplitudes of the pulses from the receiving means in accordance with a control voltage to provide the compensated pulses, means for providing a direct current reference voltage, and comparing means connected to the adjusting means and receiving said direct current reference voltage for comparing the reference pulses in the compensated pulses with the last mentioned direct current voltage to the adjusting means as said control voltage in accordance with the comparison.

9. A nuclear well logging system for providing an output corresponding to a condition sensed in a borehole, comprising a logging instrument adapted to be passed through a borehole, said instrument including detecting means responsive to penetration radiation in the borehole for providing data pulses corresponding in number and peak amplitude to the detected penetration radiation, and means for providing reference pulses; a transmission system comprising an armored coaxial cable connected between said logging instrument and surface electronics adjacent the borehole, said cable comprising an inner coaxial conductor, and outer coaxial conductor separated from said inner conductor by a coaxial first insulator, and an outer armor of conductive material separated from said outer conductor by a coaxial second insulator, said logging instrument further includes means for applying said data pulses and said reference pulses to one end of said transmission system; and said surface electronics comprising receiving means coupled to the other end of said transmission system for receiving said data pulses and said reference pulses over the armored coaxial cable from the pulse applying means, compensating means connected to the receiving means for adjusting said received pulses from the receiving means to compensate for deterioration of said pulses to provide compensated pulses, and means connected to the compensating means for providing the output corresponding to said sensed condition in accordance with the compensated pulses from the compensating means.

10. A system as described in claim 9 wherein the penetration radiation is neutron-induced gamma radiation.

11. A system as described in claim 10 wherein the penetration radiation is natural gamma radiation.

* * * * *